Patented Mar. 13, 1928.

1,662,062

UNITED STATES PATENT OFFICE.

RAY W. HESS, OF BUFFALO, NEW YORK, AND ORIN D. CUNNINGHAM, OF INDIANAPOLIS, INDIANA, ASSIGNORS TO NATIONAL ANILINE & CHEMICAL CO., INC., OF NEW YORK, N. Y., A CORPORATION OF NEW YORK.

PROCESS OF MAKING INDOPHENOLS.

No Drawing. Application filed March 25, 1922. Serial No. 546,859.

This invention relates to improvements in the manufacture of indophenols, and more particularly to indophenols produced by the condensation of p-nitrosophenol with carbazole or the N-alkyl derivatives of carbazole.

Heretofore, the method generally employed for the manufacture of indophenols by the condensation in the presence of concentrated sulfuric acid of p-nitrosophenol with carbazole or N-alkylcarbazole has been to add, with good stirring, either the solid p-nitrosophenol, or a sulfuric acid solution of p-nitrosophenol, to a sulfuric acid solution of carbazole, or of N-alkylcarbazole, at such a rate that the temperature does not rise to a point where considerable decomposition of the indophenol takes place, and by pouring the reaction mass onto ice, filtering off the precipitated indophenol and washing it with water until it shows a neutral reaction.

The present invention is based upon the discovery that indophenols manufactured by the condensation of carbazole and p-nitrosophenol in the presence of concentrated sulfuric acid are produced with superior yields of purer indophenols, and with less by-product, provided the conditions of the condensation are such that for each mol of carbazole present in the condensing medium there is always at the same time present more than 1 mol of nitrosophenol. That is, during the condensation of carbazole and nitrosophenol to produce indophenol there should be present throughout the reaction an excess of nitrosophenol over and above that necessary to just combine or condense with the carbazole, since we have found that carbazole reacts with indophenol to produce by-products and that p-nitrosophenol does not.

We have also discovered that the strength of the sulfuric acid employed is of importance in the carrying out of the condensation of p-nitrosophenol with carbazole or its N-alkyl derivatives. We have found that optimum results are obtained by the use of sulfuric acid of such strength that at the completion of the condensation the strength of the spent acid will be approximately between 93 and 94 percent. An acid of this strength has the lowest viscosity and the lowest freezing point of sulfuric acids which lie between 85 and 100 percent strength.

The use of the lowest freezing point acids permits carrying out the process at low temperatures down to the freezing point of the acids. 85% sulfuric acid freezes at approximately +5° C. while 93 to 94% sulfuric acid freezes at about −30° C. Weaker or stronger acids than indicated can be used, but the use of such acids make it necessary because of their higher freezing points to carry out the condensation at higher temperatures than otherwise, and the disadvantages which result therefrom depend upon the amount of variation of the final strength of the spent acid from 93–94 percent. On the other hand, the use of 93–94 percent sulfuric acid, due to its low freezing point, permits carrying out the reaction at low temperatures down to its freezing point of about −30° C.

For best results, therefore, we make use of sulfuric acid of the strength indicated together with the use of such an amount of nitrosophenol that there will always be an excess of it present throughout the reaction.

We have further discovered that pouring the reaction mass into a dilute caustic alkali solution containing ice so as to maintain a temperature of around 0° C. during the precipitation of the indophenol produces more uniform results with reference to yields and quality of product than does the usual manner of precipitating the indophenol by pouring onto ice.

According to the present invention we add a sulfuric acid solution of carbazole or an alkyl derivative thereof to a sulfuric acid solution of p-nitrosophenol or a derivative thereof, or we add dry carbazole or an alkyl derivative thereof to a sulfuric acid solution of p-nitrosophenol or a derivative thereof, or we add an intimate mixture of carbazole or an alkyl derivative thereof and excess of p-nitrosophenol or a derivative thereof to sulfuric acid; and in each case we always have present in the condensing medium an excess of p-nitrosophenol (or a derivative thereof) both during and at the completion of the condensation.

The invention will be further illustrated by the following specific examples, but it will be understood that the invention is not limited thereto. The parts are by weight.

*Example 1.*—130 parts of p-nitrosophenol are dissolved in 3000 parts of sulfuric acid of 94 per cent strength, which are well stirred and well cooled by external means. To this solution, whilst stirring and cooling well, there is added in small portions at a time 167 parts of dry, pulverized carbazole, at such a rate that the temperature of the solution does not exceed about −5° C., care being taken to avoid local overheating. The reaction is complete within a relatively short time, and when complete the reaction mixture is poured cautiously into a well stirred solution composed of about 2400 parts of caustic soda, 20,000 parts of water, and sufficient ice to maintain the temperature during neutralization at approximately 0° C. Sufficient caustic soda should be used so that the solution is slightly alkaline after all the acid is neutralized. The precipitated indophenol is filtered off at once and washed with water until free from alkali and sulfates. It may be dried at 60° C.

*Example 2.*—130 parts of p-nitrosophenol are dissolved in 500 parts of well stirred and well cooled sulfuric acid of 95 per cent strength, and into this solution, whilst stirring and cooling well the same, there is introduced a well cooled solution of 195 parts of N-ethylcarbazole dissolved in 500 parts of 95 percent sulfuric acid. The temperature of the mixed solutions, for best results, should not at any time be allowed to rise above −5° C. When the reaction is complete, which is within a relatively short time, the reaction mixture is neutralized by pouring it cautiously into a well stirred solution composed of 825 parts caustic soda, 15,000 parts water, and sufficient ice to maintain the temperature during neutralization at approximately 0° C. The precipitated indophenol is filtered off and treated as in Example 1.

*Example 3.*—An intimate mixture of 195 parts of pulverized N-ethylcarbazole and 135 parts of pulverized p-nitrosophenol is added to 2000 parts of well cooled and well stirred sulfuric acid of 94.5 percent strength, at such a rate that the temperature of the acid solution does not preferably exceed −5° C. When the reaction is complete, the reaction mixture is cautiously poured into a well stirred solution of 1600 parts caustic soda, 20,000 parts water, and sufficient ice to keep the temperature about 0° C. during neutralization. The precipitated indophenol is filtered off and treated as in Example 1.

A large excess of p-nitrosophenol, even to the extent of 50 percent, has no harmful effect, while an excess of carbazole, or derivatives thereof, is very detrimental. The amount of sulfuric acid may vary but the acid should be at least sufficient to yield a solution or suspension capable of being vigorously stirred in order to avoid local overheating.

It will thus be seen that the present invention effects the condensation of carbazole with nitrosophenol in the presence of sulfuric acid in such a manner that at all times during the condensation an excess of nitrosophenol is present whereby side reactions which produce by-products arising from the interaction of carbazole and indophenol are eliminated or minimized.

The invention is applicable to the manufacture of indophenols produced by the condensation of carbazole or N-alkyl derivatives thereof with p-nitrosophenol or homologues thereof in the presence of sulfuric acid.

In the claims it will be understood that the term "carbazole compound" includes only carbazole or N-alkyl derivatives thereof, while the term "para-nitrosophenol compound" includes only para-nitrosophenol and its homologues and their derivatives.

In the claims the expression "low temperature" is used to cover the range of temperature from about +5° C. to about −30° C.

We claim:

1. The method of making an indophenolic compound, which comprises condensing a carbazole compound with a para-nitrosophenol compound in the presence of sulfuric acid, and maintaining throughout the condensation an excess of the para-nitrosophenol compound.

2. The method of making an indophenolic compound, which comprises condensing a carbazole compound with a para-nitrosophenol compound in the presence of sulfuric acid such that at the completion of the condensation the strength of the acid is about 93–94 per cent, an excess of the para-nitrosophenol compound being maintained throughout the condensation.

3. The method of making an indophenolic compound, which comprises condensing a carbazole compound with a para-nitrosophenol compound in the presence of sulfuric acid maintained at a temperature below about 5° C. and such that at the completion of the condensation the strength of acid is about 93–94 per cent, an excess of the para-nitrosophenol compound being maintained throughout the condensation.

4. The method of making an indophenolic compound, which comprises condensing a carbazole compound with para-nitrosophenol in the presence of sulfuric acid maintained at a temperature not exceeding about +5° C. and not less than about −30° C., and maintaining throughout the condensation an excess of para-nitrosophenol.

5. The method of making an indophenolic compound, which comprises condensing a carbazole compound with para-nitrosophenol in the presence of concentrated sulfuric acid maintained at a temperature below about 5° C., maintaining throughout the condensation an excess of para-nitrosophenol, and pouring the reaction mixture into a dilute solution of caustic soda which is maintained at a temperature of about 0° C.

6. The method of making an indophenolic compound, which comprises the introduction of a carbazole compound into a sulfuric acid solution of p-nitrosophenol and maintained at a temperature not exceeding about +5° C. and not less than about −30° C., and maintaining throughout the condensation an excess of para-nitrosophenol.

7. The method of making an indophenolic compound, which comprises condensing N-ethylcarbazole with para-nitrosophenol in the presence of sulfuric acid, and maintaining throughout the condensation an excess of para-nitrosophenol.

8. The method of making an indophenolic compound, which comprises the introduction of N-ethylcarbazole into a sulfuric acid solution of para-nitrosophenol maintained at a temperature not exceeding about +5° C. and not less than about −30° C., and maintaining throughout the condensation an excess of para-nitrosophenol.

9. The method of making an indophenolic compound, which comprises the introduction of 1 mol of pulverized N-ethylcarbazole into a sulfuric acid solution containing more than 1 mol of para-nitrosophenol maintained at a temperature below about 5° C., and pouring the reaction mass into a dilute solution of caustic soda maintained at a temperature of about 0° C.

10. The process of making an indophenolic compound, which comprises condensing a carbazole compound with a para-nitrosophenol compound in the presence of sulfuric acid maintained at a temperature of about +5° to −30° C., the amount and strength of the sulfuric acid being such that at the completion of the condensation its strength is approximately 93–94%, maintaining in the reaction-mixture throughout the condensation an excess of the para-nitrosophenol compound, subsequently precipitating the indo-phenolic compound by addition of the reaction-mixture to an excess of an aqueous solution of caustic soda maintained at a temperature of about 0° C., and recovering the precipitate by filtration.

11. The manufacture of condensation products of N-substituted carbazole and a p-nitroso-phenol by bringing an N-substituted carbazole and a p-nitroso-phenol together in presence of a condensing agent at a temperature not exceeding about minus 5° C. and maintaining the reaction-mixture throughout the condensation at a temperature below 0° C.

12. The manufacture of condensation products of an N-alkyl carbazole and a p-nitroso-phenol by bringing an N-alkyl carbazole and a p-nitroso-phenol together in presence of sulphuric acid at a temperature not exceeding about minus 5° C. and maintaining the reaction-mixture throughout the condensation at a temperature below 0° C.

13. The manufacture of condensation products of an N-alkyl carbazole and a p-nitroso-phenol by bringing an N-alkyl carbazole and a p-nitroso-phenol together in presence of about 94% sulphuric acid at a temperature not exceeding about minus 5° C. and maintaining the reaction-mixture throughout the condensation at a temperature below 0° C.

14. In the manufacture of indophenolic compounds by the condensation of a carbazole compound with a para-nitroso-phenol compound and subsequently adding the reaction-mixture to a caustic soda solution whereby the indophenolic compound is precipitated, the step characterized by filtering off the precipitate at once.

15. In the manufacture of an indophenol by the condensation of N-ethylcarbazole with para-nitroso-phenol in the presence of sulfuric acid, the improvement which comprises bringing N-ethylcarbazole and para-nitrosophenol into reaction with one another in the presence of sulfuric acid having an initial strength of about 95 percent, the total amount by weight of the sulfuric acid employed being about five to six times the weight of the N-ethylcarbazole used in the condensation with the para-nitrosophenol.

In testimony whereof we affix our signatures.

RAY W. HESS.
ORIN D. CUNNINGHAM.